Oct. 18, 1966  R. R. ALBERS  3,279,546
ROTOR-TIP-MOUNTED PROPULSION SYSTEM FOR HELICOPTERS
Filed Sept. 22, 1965  2 Sheets-Sheet 1

INVENTOR.
RICHARD R. ALBERS
BY
George R. Powers
ATTORNEY

Oct. 18, 1966  R. R. ALBERS  3,279,546
ROTOR-TIP-MOUNTED PROPULSION SYSTEM FOR HELICOPTERS
Filed Sept. 22, 1965  2 Sheets-Sheet 2
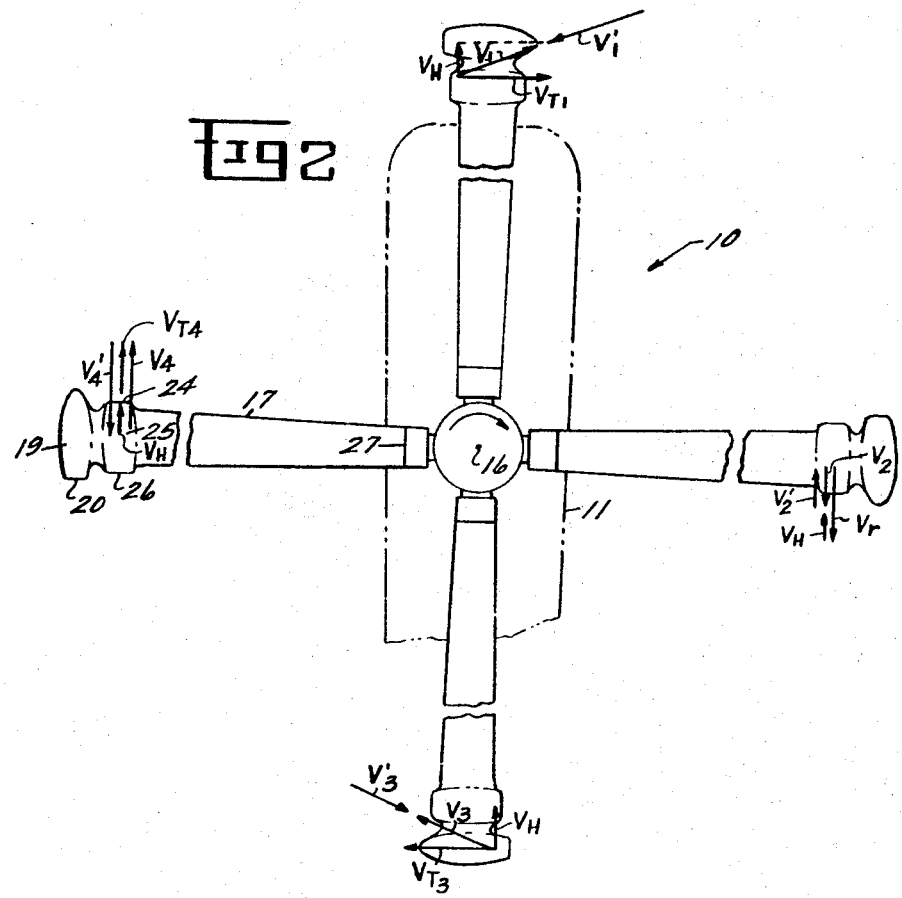
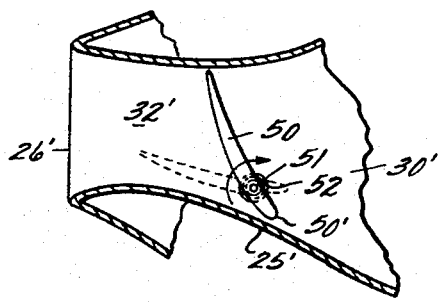
INVENTOR.
RICHARD R. ALBERS
BY
George R. Powers
ATTORNEY—

United States Patent Office 3,279,546
Patented Oct. 18, 1966

3,279,546
ROTOR-TIP-MOUNTED PROPULSION SYSTEM FOR HELICOPTERS
Richard Russell Albers, Beverly, Mass., assignor to General Electric Company, a corporation of New York
Filed Sept. 22, 1965, Ser. No. 489,166
11 Claims. (Cl. 170—135.4)

This invention relates to helicopter propulsion systems of the type having jet propulsion engines mounted on the tips of the rotor blades, and, more particularly, to novel inlet systems for reducing pressure variations and distortion in the combusion air supplied to the engines.

The rotors of helicopters are commonly driven through suitable reduction gearing by engines located within or on the fuselage of the helicopter. The power transmission equipment in such geared arrangements represents a substantial portion of the weight, complexity, initial cost and maintenance expense of the helicopter. Therefore, in order to reduce the weight, complexity, and expense of helicopters and in order to eliminate the necessity of transmitting high levels of torque through the rotor hub, it has been proposed in the past that helicopters be driven by propulsion jets acting on the outer tips of the rotor blades rather than through conventional gearboxes. Accordingly, to provide the propulsion jets, it has been proposed that complete turbojet engines be mounted on the outer tips of the rotor blades.

Heretofore, such use of rotor-tip-mounted turbojet engines for helicopter propulsion has been generally considered to be rather undesirable because of certain performance difficulties thought to be inherent in such systems. In this respect, it has been thought that a rotor-tip-mounted turbojet engine is inherently incapable of operating in any sort of uniform manner during forward flight of the helicopter, it being, of course, understood by those skilled in the art that it is extremely desirable that a continuous combustion engine such as a gas turbine engine operate in a uniform or steady state, manner. To operate uniformly, it is essential that a gas turbine engine be continuously supplied with an uninterrupted flow of combustion air at uniform conditions. When, however, a turbojet engine is mounted on the tip of a rotor blade and is directly supplied with air inducted through an inlet opening in the leading edge of the blade, the flow of air received by the engine is far from uniform even though the ambient conditions may be uniform. In such an arrangement, the combustion air is supplied with extreme and cyclic variations in dynamic pressure and with substantial and cyclicly varying distortion. The reasons for these cyclic variations will be readily apparent (and will be described in detail at a later point in this specification) by noting that the rotor tips traverse a circular path relative to the helicopter while the helicopter is simultaneously moving in the forward direction. As a result of these superimposed motions, the air to any particular engine is supplied with a constantly varying velocity head and at constantly varying directions relative to the engine inlet. Consequently, the air flow through the engine and the engine's power output are not constant. Furthermore, and perhaps of even greater importance, the engine is continuously subjected to undesirable transient mechanical and thermal conditions for which it is not designed and which it is incapable of withstanding for prolonged periods.

It is therefore an object of this invention to provide for helicopters an improved rotor-tip-mounted propulsion system which is capable of substantially uniform operation during helicopter flight.

Another object is to provide a propulsion system for helicopters in which rotor-tip-mounted turbojet engines are supplied with combustion air at substantially constant conditions during flight.

A further object is to provide for helicopters an improved propulsion system in which rotor-tip-mounted engines provide essentially constant power output during helicopter flight.

A still further object of this invention is to provide a propulsion system for helicopters in which rotor-tip-mounted turbojet engines are not continually subjected to transient mechanical and thermal conditions during helicopter operation.

Briefly stated, in carrying out the invention in one form, a propulsion system for driving a helicopter rotor assembly is located on the outer tip of a rotor blade, the complete propulsion system including a jet propulsion turbojet engine and an inlet system for supplying combustion air to the engine. More particularly, the inlet system includes a plenum within the rotor blade adjacent the engine for receiving combustion air through inlet means in the leading edge of the rotor blade and for supplying at least a portion of the air to the engine through first outlet means. To supply the air to the first outlet means and the engine at a substantially uniform pressure, second outlet means are provided for discharging air from the plenum through an outlet opening in the trailing edge of the rotor blade, movable valve means and suitable control means being provided for varying the flow area through the second outlet means in accordance with preselected operating conditions.

By a further aspect of the invention, the control means may position the movable valve means in accordance with the pitch of the rotor blade, a maximum flow area through the second outlet means being scheduled when the rotor blade has a low angle of attack and is advancing relative to the direction of flight and a minimum flow area being scheduled when the rotor blade has a high angle of attack and is retreating. Also in accordance with the invention, means may be provided for overriding the primary control means to maintain the movable valve means in its minimum area position when the helicopter has no forward velocity, i.e. when the helicopter is hovering. By a still further aspect of the invention, the movable valve means may be directly positioned as a function of the pressure within the plenum rather than in accordance with rotor pitch, suitable biasing means being provided to urge the valve means to its minimum flow position.

While the invention is distinctly claimed and is particularly pointed out in the claims appended hereto, the invention, along with other objects and advantages thereof, will be better understood and appreciated from the following detailed description when taken in conjunction with the drawings, in which:

FIG. 2 is a plan view of the helicopter of FIG. 1 illustrating the various directions and relative velocities at which air is inducted when the rotor assembly is turning at a constant angular velocity and the helicopter is travelling at a constant forward velocity;

FIG. 4 is a view of a second embodiment of the valve means for varying the flow area in the outlet from the plenum.

Figure 1:
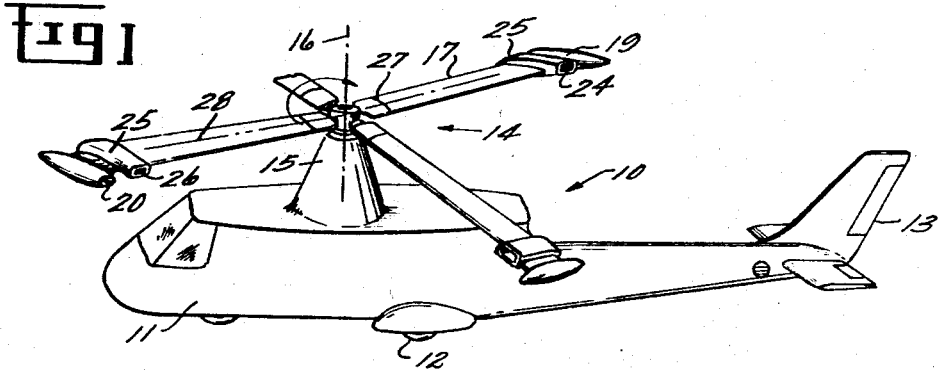
FIG. 1 is a pictorial view of a helicopter propelled in accordance with the present invention.

Referring first to FIG. 1, a helicopter indicated generally by the numeral 10 is illustrated, the helicopter 10 having a fuselage 11, a landing gear assembly 12, and a tail assembly 13 including openings 13a through which reaction jets fed by engine bleed or an auxiliary power system may be discharged to control yaw. A main rotor assembly 14 comprises a hub 15 rotatably mounted on the fuselage 11 for rotation about a vertical axis 16 and a plurality of rotor blades 17 extending radially outward from the hub 15 for rotation about the axis 16 in a horizontal plane. To drive the main rotor assembly 14 and thus propel the helicopter 10, small jet propulsion engines 18 (see FIG. 3) are mounted on the outer tips of the blades 17 in streamlined pods 19 terminating at their aft ends in exhaust openings 20 through which the propulsion gases are discharged. The engine 18 is of a type particularly suited for use in the extremely high centrifugal force field present at the outer tip of the rotor blade 17, the engine components being arranged such that the gas flow within the engine 18 is at all times either along the longitudinal axis 28 of the blades 17 or symmetrical therewith. The front ends of the pods 19 are closed, aerodynamically smooth surfaces, the air required to support combustion in the turbojet engines 18 being inducted through inlet openings 24 in pods 25 carried by the blades 17 immediately inward of the pods 19. For reasons which will become clear as this description proceeds, an outlet opening 26 is formed in the aft ends of each of the pods 25 through which air may be discharged under certain conditions. Thus, with it understood that the main rotor assembly 14 rotates in the direction indicated during helicopter operation, it can be said that air is admitted from the leading edge of each blade 17 through inlet means including the inlet opening 24 and that combustion products and excess air are discharged to the trailing edge of each blade 17 through the exhaust opening 20 and outlet means including the outlet opening 26, respectively.

With reference still being directed to FIG. 1, it will be noted that the main rotor assembly 14 is of the variable pitch type in which the portions of the blades 17 outwardly of joints 27 adjacent the hub 15 may be rotated about their longitudinal axes 28 so as to change the angle of attack. The "angle of attack" may be defined as being the angle between a representative blade chord and the horizontal plane in which the blade rotates. A "low angle of attack" exists when he angle is small, and a "high angle of attack" exists when the angle is large. It is well known to those skilled in the art that it is desirable during normal forward flight that the rotor blades 17 have low angles of attack when they ade advancing (moving forward relative to the fuselage 11) and that they have high angles of attack when they are advancing (moving forward tive to the fuselage 11). As a result, it is rather common in helicopters to provide suitable means for continually varying the angle of attack as the rotor blades traverse their circular paths relative to the hub and the helicopter fuselage. It is to be understood that the helicopter 10 is provided with such pitch control means for adjusting the pitch of the rotor blades in accordance with desired operating conditions. To the practice of the present invention, which will be described presently, the precise arrangement utilized for adjusting the pitch, such that a low angle of attack is scheduled for each blade as it is advancing and that a high angle of attack is scheduled when it is retreating, is not important since various arrangements well known in the art may be used with equal advantage. The fact, however, that the pitch is normally adjusted in the particular manner just described during normal forward flight is of great importance with respect to one of the embodiments of the invention which will be described presently.

Before proceeding to a detailed description of the novel propulsion and inlet system of this invention, it will be well to turn attention to FIG. 2 for a brief discussion of the aerodynamics of rotor-tip-mounted jet propulsion systems, FIG. 2 being a plan view of the helicopter 10 of FIG. 1. More particularly, the discussion will be concerned primarily with the various pressure and distortion difficulties heretofore common to such systems. Referring now to FIG. 2, let it be assumed that the helicopter 10 has a velocity $V_H$ in the forward direction, which is upward as viewed in FIG. 2, and that the rotor assembly 14 is turning in the clockwise direction with a constant angular velocity such that the inlet openings 24 have a constant tangential speed relative to the rotor hub 15. Thus, when an inlet opening 24 is in front of the helicopter in a 12 o'clock position, as viewed, the opening 24 is travelling with an absolute velocity $V_1$, the components being the forward velocity $V_H$ of all parts of the helicopter and the tangential velocity $VT_1$, when the opening 24 is in the 12 o'clock position. Since the atmosphere through which the helicopter 10 is travelling is substantially motionless, the air entering the inlet opening 24 in the 12 o'clock position has a velocity of $V_1'$ relative to the inlet opening 24. For an inlet opening in the three o'clock position, the forward helicopter velocity $V_H$ and the rearward tangential velocity $VT_2$ are along the same line, but are oppositely directed. As a result, the air entering the inlet opening has a relative velocity of $V_2'$. Similarly, the relative velocity of air entering an inlet opening in the six o'clock position is $V_3'$, and the relative velocity at the nine o'clock position is $V_4'$. It will, of course, be understood that each inlet opening 24 successively moves through these and all intermediate positions.

Now it will be obvious to those skilled in the art that the air supplied to any one of the inlet openings 24 does not have the characteristics of a uniform stream, the direction and speed at which the air approaches and enters the opening continually changing in the manner just described. In this respect, it will be noted that the air velocity is greatest when the inlet opening 24 and the respective rotor blade 17 are advancing (nine o'clock position) relative to the fuselage 11 and that the air velocity is least when the opening 24 is retreating. Since the total pressure includes both static and dynamic, or velocity, pressure, the latter varying as the square of the velocity, it will be obvious that the total pressure of the air supplied is greatest when the opening 24 is advancing and least when the opening is retreating. At all other positions of the openings 24, the total pressure will be somewhere between these extremes. If the entire stream of air were at all times supplied directly to the engine, the cyclic changes in dynamic pressure would cause corresponding and pulsating changes in the rate of flow through the engine and in the rate of power output. In addition, if the air stream with its continually changing direction were directly supplied to the engine, distortion could occur within the engine. In this respect, it will be understood that the air flow and the combustion products should be uniformly distributed around the annular flow path of a turbojet engine at all times. If, however, the air approaches an engine at an angle rather than along the engine axis, the air may tend to pile up on one side of the annular passageway and thereby cause unbalanced loading and local hot spots within the engine. The novel inlet arrangement of this invention overcomes these difficulties.

Figure 3:
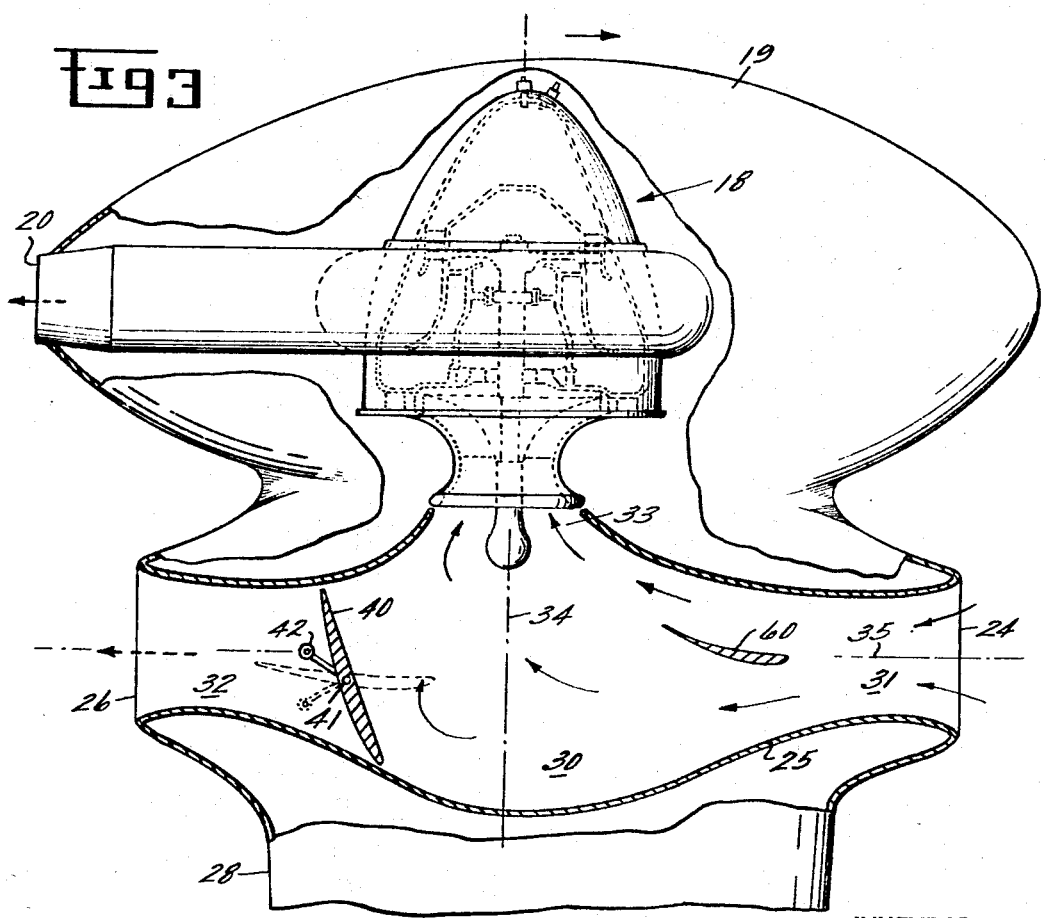
FIG. 3 is a detailed view of one of the rotor-tip-mounted propulsion systems.

With reference now being directed to FIG. 3, it will be seen that a relatively large plenum chamber 30 is formed within the pod 25, the plenum 30 communicating with the inlet opening 24 by means of a forward duct 31 and communicating with the outlet opening 26 by means of a rear duct 32. The turbojet engine 18 within the outer pod 19 communicates with the plenum 30 through an outlet duct 33 from the plenum chamber, the longitudinal axes 34 of both the engine 18 and the outlet duct 33 being substantially coaxial with the longitudinal axis 28 of the rotor blade 17 and perpendicular to the axis 35 of the inlet and outlet ducts 31 and 32, respectively. To vary the cross-sectional flow area of the outlet duct 32, an airfoil-shaped flap valve 40 is pivotally supported about a vertical axis 41 for movement between a minimum area, or minimum flow, position illustrated by solid lines and a maximum area, or maximum flow, position illustrated by broken lines. A linkage 42 is connected to the flap valve 40 for pivoting it about its axis 41, the linkage 42 being connected at its other end (not shown) to the pitch control means such that the position of the flap valve 40 is controlled as a direct function of the blade pitch. The required interrelationship between the position of flap valve 40 and the blade pitch, or angle of attack, will soon become apparent.

If the flap valve 40 were held in its minimum flow position for all rotational positions of the associated rotor blade 17 during forward flight of the helicopter 10, the dynamic pressure of the air supplied to the engine 18 would vary greatly in the manner described previously. However, by keeping the valve 40 in its minimum flow position when the dynamic pressure is normally low and by opening the valve 40 to its maximum flow position when the dynamic pressure is normally high, thus bypassing a portion of the air through the outlet means comprising the outlet duct 32 and the outlet opening 26, the total pressure within the plenum 30 may be kept at a more uniform level. For what would normally be intermediate pressure levels within the plenum 30, the flap valve can be positioned in intermediate positions between its extreme illustrated positions.

The general relationship between blade pitch and the position of the valve 40 will now be clear. Briefly stated, a maximum flow area in the outlet duct 32 should be scheduled when the rotor blade 17 is advancing at low pitch, and a minimum flow area should be scheduled when the rotor blade 18 is retreating at high pitch. Therefore, the linkage 42 should interconnect the pitch control means and the flap valve 40 such that the pitch and the flow area are varied in unison in the desired manner. As stated previously, the precise arrangement used for varying the pitch is unimportant and is therefore not illustrated; similarly, the precise manner in which the linkage 42 is connected to the pitch control means is not described and illustrated.

When the helicopter 10 is hovering without forward velocity, the pitch will remain constant at all rotational positions and the velocity of the air stream relative to the inlet opening 24, will, of course, also remain constant. To provide maximum power under such conditions, the flap valve 40 may be held in the minimum flow position by suitable override means even though the constant pitch may not be precisely that which would normally be associated with the minimum flow position. This override means can be, of course, tied in with and form a part of the pitch control means. As such, the override means would act through the linkage 42 to hold the flap valve 40 in its minimum flow position when the helicopter has no forward velocity.

Referring now to FIG. 4, an alternative valve arrangement is illustrated, the arrangement comprising an airfoil-shaped flap valve 50 pivotally mounted on a vertical axis 51 in the outlet duct 32' and a coil spring 52 urging the valve 50 toward its minimum flow position, or in the clockwise direction as viewed. The axis 51 is adjacent the leading edge 50' of the flap valve 50 such that a pressure higher than ambient in the plenum chamber 30' and the outlet duct 32' upstream of the valve 50 will urge the valve toward its maximum flow position, or in the counterclockwise direction. As a result, the flap valve 50 will at all times assume an equilibrium position between the extreme positions which are illustrated. More particularly, the spring 52 is selected such that during normal forward flight conditions the pressure within the plenum 30' remains substantially uniform. To accomplish this, the pressure forces acting on the flap valve 50 when the rotor blade is advancing should be sufficient to fully open the valve, while the spring 52 should have sufficient force to hold the valve 50 in its closed position when the rotor blade is retreating. By thus bleeding off a portion of the air when the air is supplied with a high velocity and by supplying the entire flow to the engine when the approach velocity is low, the total pressure within the plenum 30' can be held at a stable level. It will readily occur to those skilled in the art that this valve arrangement is particularly suited for use in helicopter rotor assemblies in which the blade pitch is not changed or in which an extremely reliable and simple valve arrangement is desired.

With reference to FIG. 3, it will be appreciated that since the air stream is not supplied directly to the engine 18, but rather to the plenum 30 from which the engine 18 is then supplied, the engine 18 will not be subjected to substantial distortion since the effects of the changing direction will be greatly alleviated. To further reduce distortion, a stationary guide vane 60 may be provided in the inlet duct 31 for directing the air to the outlet duct 33 and the engine 18 in an even more uniform manner.

It will thus be seen that this invention provides a helicopter rotor-tip-mounted propulsion system which is capable of substantially uniform operation during forward flight as well as during stationary operation. It will also be appreciated that the inlet system of this invention provides the rotor-tip-mounted engine with a continual stream of combustion air which is of substantially uniform pressure and which is substantially free of distortion.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In a helicopter having a rotor assembly including a plurality of variable pitch rotor blades mounted for rotation in a fixed direction about a substantially vertical axis, pitch control means for adjusting the pitch of the rotor blades in accordance with desired operating conditions, and a plurality of jet propulsion engines carried at the outer tips of respective ones of the rotor blades for driving the rotor assembly; a plurality of inlet systems for supplying combustion air to respective ones of said engines, each of said inlet systems comprising:

means forming a plenum in the respective rotor blade adjacent the respective jet propulsion engine, inlet means communicating with said plenum for admitting air thereto from the leading edge of said rotor blade relative to the fixed direction of rotation, first outlet means connecting said plenum to said combustion engine for delivering air to said engine, second outlet means communicating with said plenum for discharging air therefrom through the trailing edge of said rotor blade, a movable airfoil-shaped flap valve in said second outlet means, and control means connecting said flap valve to the pitch control means for positioning said flap valve in accordance with the pitch of said rotor blades so as to maintain a substantially uniform pressure level in said plenum during helicopter operation, a maximum flow area through said second outlet means being scheduled when said rotor blade has a low angle of attack and a minimum flow area through said second outlet means being scheduled when said rotor blade has a high angle of attack.

2. An inlet system as defined by claim 1 including means for overriding said control means to maintain said flap valve in its minimum flow position when said helicopter has no forward velocity.

3. An inlet system as defined by claim 1 in which the longitudinal axis of said first outlet means is substantially perpendicular to the longitudinal axis of said inlet means and said second outlet means and radially outward thereof with respect to the longitudinal axis of the rotor blade.

4. An inlet system as defined by claim 3 including guide means for directing air from said inlet means to said first outlet means so as to reduce distortion in the air stream supplied to the jet propulsion engine.

5. In a helicopter having a rotor assembly including a plurality of rotor blades mounted for rotation in a fixed direction about a substantially vertical axis, a plurality of propulsion systems each comprising:

a jet propulsion engine carried at the outer tip of the respective rotor blade, the axis of rotation of said engine being coaxial with the longitudinal axis of said rotor blade, means forming a plenum in said rotor blade adjacent said engine and immediately inward thereof, inlet means communicating with said plenum for admitting air thereto from the leading edge of said rotor blade relative to the fixed direction of rotation, first outlet means connecting said plenum to said combustion engine for delivering air to said engine, second outlet means communicating with said plenum for discharging air therefrom through the trailing edge of said rotor blade, movable valve means for varying the flow area of said second outlet means, and means for controlling the position of said valve means such that the flow area of said second outlet means is varied in accordance with preselected operating conditions so as to supply air to said first outlet means and said combustion engine at substantially uniform pressure.

6. A propulsion system as defined by claim 5 including means for overriding said control means to maintain said movable valve means in its minimum flow area position when said helicopter has no forward velocity.

7. In a helicopter having a rotor assembly including a rotor blade mounted for rotation in a fixed direction about a substantially vertical axis and a combustion engine carried at the outer tip of the rotor blade for driving the rotor assembly; an inlet system for supplying combustion air to said engine, said inlet system comprising:

means forming a plenum in said rotor blade adjacent said combustion engine, inlet means communicating with said plenum for admitting air thereto from the leading edge of said rotor blade relative to the fixed direction of rotation, first outlet means connecting said plenum to said combustion engine for delivering air to said engine, second outlet means communicating with said plenum for discharging air therefrom through the trailing edge of said rotor blade, movable valve means for varying the flow area of said second outlet means to thereby maintain the air supplied to said first outlet means and said combustion engine at substantially uniform pressure throughout the rotation of said rotor blade.

8. An inlet system as defined by claim 7 in which said valve means is positioned such that the flow area of said second outlet means is varied substantially in accordance with the forward velocity of said helicopter and the rotational position of said rotary blade.

9. An inlet system as defined by claim 7 including means for maintaining said movable valve means in its minimum flow area position when said helicopter has no forward velocity.

10. An inlet system as defined by claim 7 including pressure responsive means for positioning said movable valve means in accordance with the pressure within said plenum, the flow area increasing with increasing pressure and decreasing with decreasing pressure within said chamber.

11. An inlet system as defined by claim 10 in which said movable valve means and said pressure responsive means comprise:

an airfoil-shaped flap valve pivotally mounted in said second outlet means, said flap valve being movable between a minimum flow area position and a maximum flow area position, the axis of rotation of said flap valve being located such that the air within said plenum exerts a force proportional to the pressure therein on said flap valve in a direction to move said valve to said maximum flow area position, and means biasing said flap valve to said minimum flow area position.

References Cited by the Examiner

UNITED STATES PATENTS

| 2,446,129 | 7/1948 | Dalton | 170—135.4 |
| 2,474,359 | 6/1949 | Isacco | 170—135.4 |
| 2,696,267 | 12/1954 | Mouravieff | 170—135.4 |
| 2,931,441 | 4/1960 | Root | 170—135.4 |

MARTIN P. SCHWADRON, *Primary Examiner.*

E. A. POWELL, JR., *Assistant Examiner.*